(12) United States Patent
Jackelen

(10) Patent No.: US 6,930,791 B2
(45) Date of Patent: Aug. 16, 2005

(54) METHOD FOR SELECTING A FINISHING DEVICE FOR DIGITAL PRINTING

(75) Inventor: Jeffrey A. Jackelen, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 929 days.

(21) Appl. No.: 09/794,525

(22) Filed: Feb. 27, 2001

(65) Prior Publication Data
US 2002/0118382 A1 Aug. 29, 2002

(51) Int. Cl.[7] .......................... G06K 15/02; G06F 3/12; G06F 13/00
(52) U.S. Cl. ..................... 358/1.15; 358/1.14; 358/1.13
(58) Field of Search .................. 358/1.15, 1.14, 358/1.13, 1.9, 594, 1.2, 1.3, 1.4, 501, 401, 402; 399/79, 87, 75, 38, 39

(56) References Cited

U.S. PATENT DOCUMENTS 5,267,727 A   12/1993  DeHority
5,850,584 A * 12/1998  Robinson et al. ............. 399/79

* cited by examiner

Primary Examiner—Douglas Tran
(74) Attorney, Agent, or Firm—Richard A. Romanchick

(57) ABSTRACT

Methods for selecting finishing devices to perform finishing operations on a print run. The print job contains demands for which finishing operations must be performed on the print run. The printing device contains suggestions for which finishing operations may, but need not, be performed on the print run. In operation, the printing device selects a finishing device that can perform all demands and a maximum number of suggestions. The suggested finishing operations are stored in a memory of the printing device and may be defaults or entered by a printer operator. Upon selecting the finishing device, the printing device directs the print run to the selected finishing device for processing.

13 Claims, 3 Drawing Sheets

FIG. 1

STAPLER  PRINTING DEVICE  STAPLER-STACKER

FIG. 2

METHOD FOR SELECTING A FINISHING DEVICE FOR DIGITAL PRINTING

FIELD OF INVENTION

The present invention relates to digital printing. More specifically, it relates to methods for selecting finishing devices in digital printing.

BACKGROUND OF THE INVENTION

Digital printing is changing the printing industry. In digital printing, a customer creates an electronic version of a document and sends it to a printer operator for final formatting, printing, and assembly on selected printing devices. Digital printing is mutually advantageous to both the customer and the printer operator: the customer has greater control over what the final document will look like because the electronic version that he creates accurately communicates his vision to the printer operator; and the printer operator spends less time in formatting the document because he can immediately appreciate the customer's vision of the final printed document, and he can return a corrected electronic version to the customer for the customer's proofing and approval. Thus the printer operator and the customer may refine a document together before the final print run by means of a shared electronic version.

The customer typically sends a job to the printer operator in pieces or he creates a cohesive document in an electronic form using print document creation software, such as that provided by Adobe Systems Inc. of Palo Alto, Calif. under the name, "Acrobat." The print document creation software allows customers to combine elements of the document from text files, image files, and outputs of other computer programs into the cohesive document. For example, a document may simultaneously contain text to be printed in a selected font from a word processor output file, a bitmapped image stored as a graphics file, and the output from a spreadsheet program. The print document creation software typically presents the customer with a what-you-see-is-what-you-get ("WYSIWYG") image on a computer monitor that represents the final print document. The print document creation software incorporates the contents of files into the document, provides layout functions for scaling and combining the various elements on the page, displays the layout on the computer monitor, and outputs a composite electronic document for storage and transfer. Also, editing and rearrangement of the elements may be immediately viewed on the computer monitor. In such a manner, customers have substantial autonomy over the contents and layout of the document while creating the electronic version, unencumbered by considerations of the printing devices and the media on which they print.

The printer operator is responsible for creating a final, cohesive, print document for production. If the customer sends his print job to the printer operator as separate pieces or separate files, the printer operator typically assembles a cohesive document as a WYSIWYG file. Alternatively, the customer submits the print job to the printer operator already in the form of a WYSIWYG file. When the document is ready for printing, the printer operator directs the pages of the document to various printing devices, each of which are appropriate for printing a particular format and media. For example, the printer operator may designate that pages of the document having color graphics are to be printed on a color printing device, but that pages of the document having only text are to be printed on a black-and-white printing device, rather than the color printing device, in order to save some money for the customer and more efficiently use the printer operator's resources. Thus the printer operator typically groups pages of the document together for separate printing on an appropriate printing device.

A printing device may have attached to it one or more finishing devices. After printing, the pages pass through one of the available finishing devices that are attached to the printing device. The finishing device processes the printed pages in furtherance of completion of the print run, and may perform more than one finishing operation on the pages. The printer operator may explicitly designate the finishing device that processes the output of the printing device. For example, the finishing device may collate the printed pages into separate groups and then staple each group together. Alternatively, the finishing device may perform only one finishing operation, such as stacking. But even if the finishing device is able to perform some of the finishing operations requested by the printer operator, it may not be capable of performing those operations on the print job as output by the printing device. For example, the printing device may output a print job on large size media but the available collator can only process medium and small size media. Thus, the printer operator has also to consider the capabilities of the finishing devices attached to each printing device when directing pages of the document to the printing device.

The attributes of each finishing device attached to a printing device are stored in memory in the printing device. The attributes are typically included in a software release by the vendor of the printing device. Adding another finishing device to the printing device whose attributes are not stored in the memory, however, requires the vendor to write, debug, and distribute a new software release to support the added finishing device. The finishing devices that can be attached to the printing device are therefore limited to those whose attributes reside in the printing device's memory. The printing device is therefore not sufficiently flexible to allow for the attachment of a new finishing device without a software upgrade.

Also, the printer operator or customer may request a specific finishing operation or finishing device after printing by the printing device. The customer or the printer operator can request the specific finishing operation or device in the WYSIWYG file. Currently, however, the printing device has to determine whether it has the appropriate finishing device attached to it and programmed into the software in the printing device. If the printing device does have the appropriate finishing device attached and the software installed, the printing device sends the output to the specific finishing device. But without the software upgrade, the printing device cannot automatically determine whether the printing device has an appropriate finishing device in response to instructions in the WYSIWYG file and configure itself to send its output to the finishing device. Additionally, the printing device cannot automatically select among more than one finishing devices absent instructions in the WYSIWYG file or configuration by the printer operator.

It is therefore desirable that the printing device ascertains the attributes of the finishing devices that are attached to it without a software upgrade. Such a feature may be useful for attaching new finishing devices to the printing device.

It is also desirable that the printing device is able to select the appropriate finishing device in response to instructions from the shared electronic version of the document. Such a feature may be useful to allow the customer or printer operator to include instructions for finishing in the WYSIWYG file during some or all stages of the document production.

It is further desirable that the printing device is able to select the most appropriate finishing device according to predetermined criteria in the absence of instructions in the shared electronic version of the document. Such a feature may be useful to allow the customer or printer operator to leave the choice of finishing to the printing device.

SUMMARY OF THE INVENTION

One aspect of the invention is a method for selecting a finishing device for digital printing, wherein the finishing device performs one or more finishing operations on a print job from a printing device. The method includes receiving an input data stream for the print job in the printing device. The input data stream is an electronic version of the print job. The printing device determines whether the finishing device can perform all demanded finishing operations. The input data stream includes instructions associated with the demanded finishing operations. When the finishing device can perform all demanded finishing operations, the printing device determines whether the finishing device can perform a maximum number of suggested finishing operations. The printing device includes the suggested finishing operations in a memory. When the finishing device can perform the maximum number of the suggested finishing operations, the printing device directs the print job to the finishing device.

Another aspect of the invention is a method for connecting a finishing device to a printing device for digital printing. The finishing device performs one or more finishing operations on a print job from the printing device. The method includes mechanically attaching the finishing device to the printing device such that the finishing device is capable of receiving the print job from the printing device. Attributes of the finishing device are stored into a memory of the printing device. The attributes of the finishing device correspond to the one or more finishing operations.

The foregoing and other features and advantages of preferred embodiments of the present invention will be more readily apparent from the following detailed description, which proceeds with references to the accompanying drawings.

DETAILED DESCRIPTION OF PREFERRED EMBODIMENTS

Digital printing requires that a printer operator create an electronic version of a composite document before the final print run. Typically, the electronic version of the document is a computer readable file written in a Page Description Language ("PDL"). PDL files contain commands in American Standard Code for Information Interchange ("ASCII") format. An advantage of storing a document as a PDL file is that the PDL file is typically much smaller than if the document were stored as a bitmapped image file. The printing device reads the PDL file and performs printing functions according to the instructions in the PDL file. Sending instructions to the printing device in ASCII code is more efficient than creating a bitmapped image of the document and then sending the bitmapped image to the printing device. For example, it is much more efficient to send a few ASCII characters to the printing device that instruct the printing device to print the string "PDL" in 24 point Times New Roman font than it is to create a bitmapped image of the string at 600 dots per inch resolution and then send the whole bitmapped image to the printing device. Examples of PDL file formats are the Portable Document Format ("PDF") format and the PostScript format, both by Adobe Systems Inc. of Palo Alto, Calif.

Figure 1:
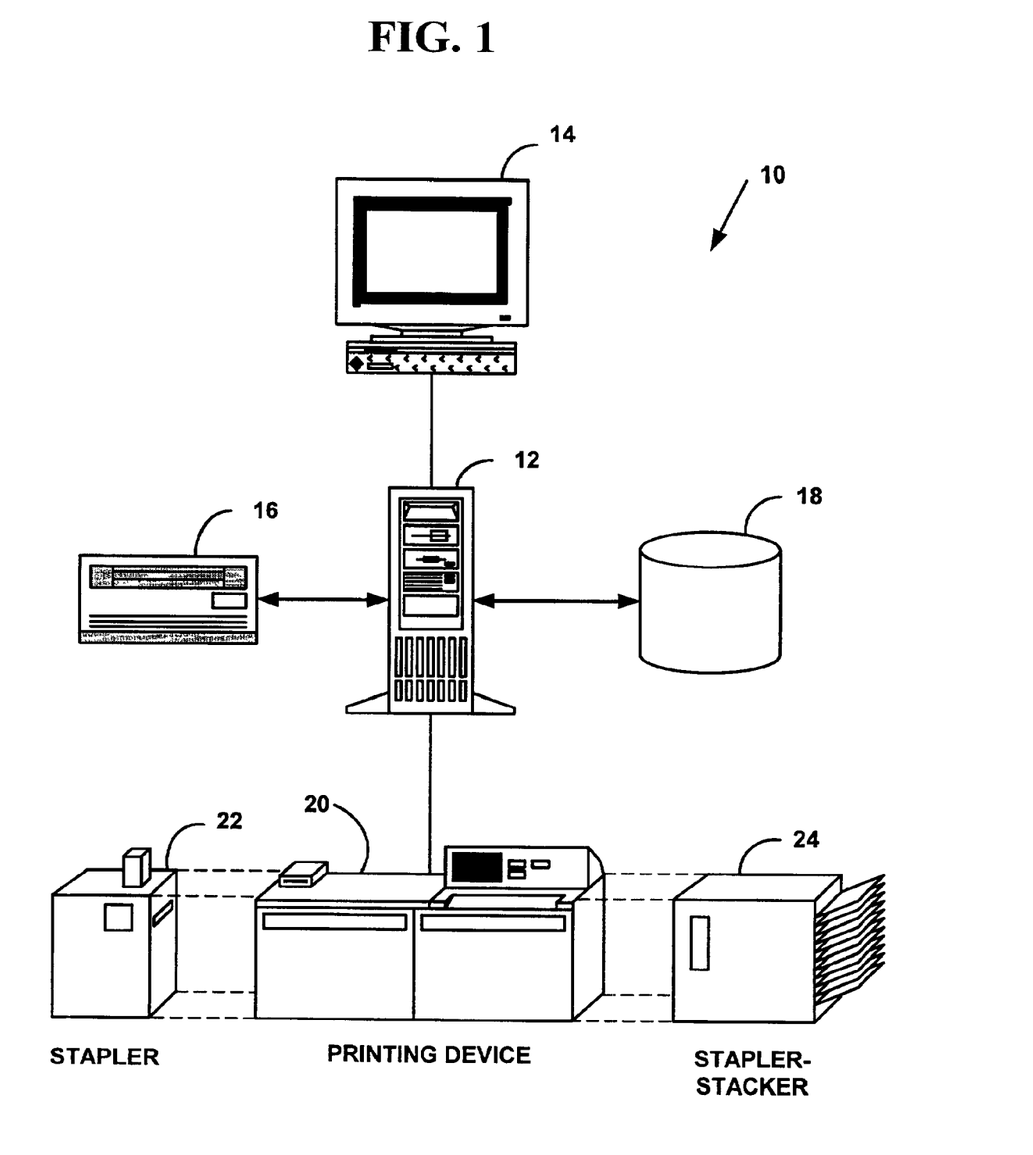
FIG. 1 is a block diagram illustrating a configuration of a digital printing system.

PDL files are typically stored on a computer readable medium and are accessible by a computer running a Print Document Management System program. FIG. 1 is a block diagram illustrating a digital printing system 10. A printer operator formats a document by altering an electronic version of the document on a computer 12 running the Print Document Management System program. The printer operator views changes to the document on a computer monitor 14 providing a WYSIWYG representation of the document. The electronic version of the document may be read from or recorded to a portable computer readable medium by means of a portable medium drive 16 such as a CD-ROM drive, a floppy disk drive, or a Zip drive familiar to those of ordinary skill in the computing art. For example, the customer may provide a PDF file to the printer operator on a CD-ROM, which the printer operator loads into a CD-ROM drive and reads the PDF file into memory on the computer 12. After formatting the document using the Print Document Management System software, the printer operator may write the amended PDF file to another CD-ROM in the CD-ROM drive and send the CD-ROM to the customer for proofing. Also, the printer operator may archive the electronic version on a computer readable storage medium 18 such as a hard disk drive or a tape drive.

When ready for printing, the printer operator instructs the computer 12 to send some or all of the PDL file to one or more printing devices 20 as a data stream. Each printing device 20 processes the PDL instructions in the data stream that it receives from the computer 12 and prints one or more pages of the document. The printing device 20 sends the printed pages to a finishing device selected from one or more finishing devices 22, 24. The selected finishing device 22, 24 processes the printed pages of the document.

Each finishing device is mechanically attached to its printing device, as indicated by the dashed lines in FIG. 1, in order to receive the printed pages from the printing device. The finishing devices 22, 24 may also be electrically connected to the printing device 20 in order to receive instructions for performing the finishing operations from the printing device 20. Some finishing devices 22, 24 perform only one finishing operation. For example, a stapler 22 typically only staples the print job that it receives from the printing device 20. Alternatively, some finishing devices 22, 24 are capable of performing more than one finishing operation. For example, the stapler-stacker 24 typically both staples and stacks the print job that it receives from the printing device 20. Further, some finishing devices 22, 24 must always perform one set of finishing operations but, optionally, may perform another set of finishing operations at the direction of the printer operator or the printing device 20. For example, the stapler-stacker 24 may compulsorily always stack print jobs that it receives from the printing device 20, but may optionally staple the print job or not staple the print job. The optional finishing operations may be engaged or disengaged either mechanically, electrically, or both by the printing device 20. Examples of other finishing devices (not shown) include a folder, a booklet maker, a wire binder, a book binder, a top feed, as well as many other such finishing devices familiar to those of ordinary skill in the digital printing art.

It is to be understood, however, that the present invention is not limited to the devices or configuration shown in FIG. 1 and that other devices and configurations could be used. For example, the computer 12 may be integral with the printing device 20, in which case the computer 12 and printing device 20 of FIG. 1 represent separate functional components of the combined device. Also, the electronic versions of the documents need not be in PDL format and need not be stored on CD-ROMS, floppy disks, or hard disks. Many other formats for storing the document in electronic form are possible, such as in graphical format, and on other storage media, and the present invention is not restricted to the formats and media described herein.

An operating environment for the computer 12, printing devices 20, finishing devices 22, 24, and other devices of the present invention includes a processing system with at least one Central Processing Unit ("CPU") (not shown) and a memory system (not shown). Preferably, a CPU (not shown) controls the operations of the computer 12. In accordance with the practices of persons skilled in the art of computer programming, the preferred methods are described herein with reference to acts and symbolic representations of operations that are performed by the processing system, unless indicated otherwise. Among its acts and operations, the CPU instructs the printing devices 20 to load fonts, perform diagnostics, and process PDL files for printing. The CPU may also instruct the computer's 12 memory system to read or write data, such as PDL files, to or from the portable media device 16 or the computer readable storage medium 18. One CPU on which the preferred methods may run and which may be incorporated into the preferred embodiments of the apparatus is a "x86" series processor manufactured by Intel Corporation, of Santa Clara, Calif., although it should be understood that the present invention is not restricted to this series of processors and that other processors may be used.

It will be appreciated that the acts and symbolically represented operations include the manipulation of electrical signals by the CPU. The electrical signals represent data bits that cause a resulting transformation or reduction of the electrical signal representation. The computer 12, printing devices 20, finishing devices 22, 24, and other devices maintain data bits at memory locations in their respective memory system to reconfigure or otherwise alter their CPU's operation, as well as other processing of signals. The memory locations, such as random access memory ("RAM"), are physical locations that have particular electrical, magnetic, or optical properties corresponding to the data bits, depending on the type of memory used.

Connecting a Finishing Device to the Printing Device

Figure 2:
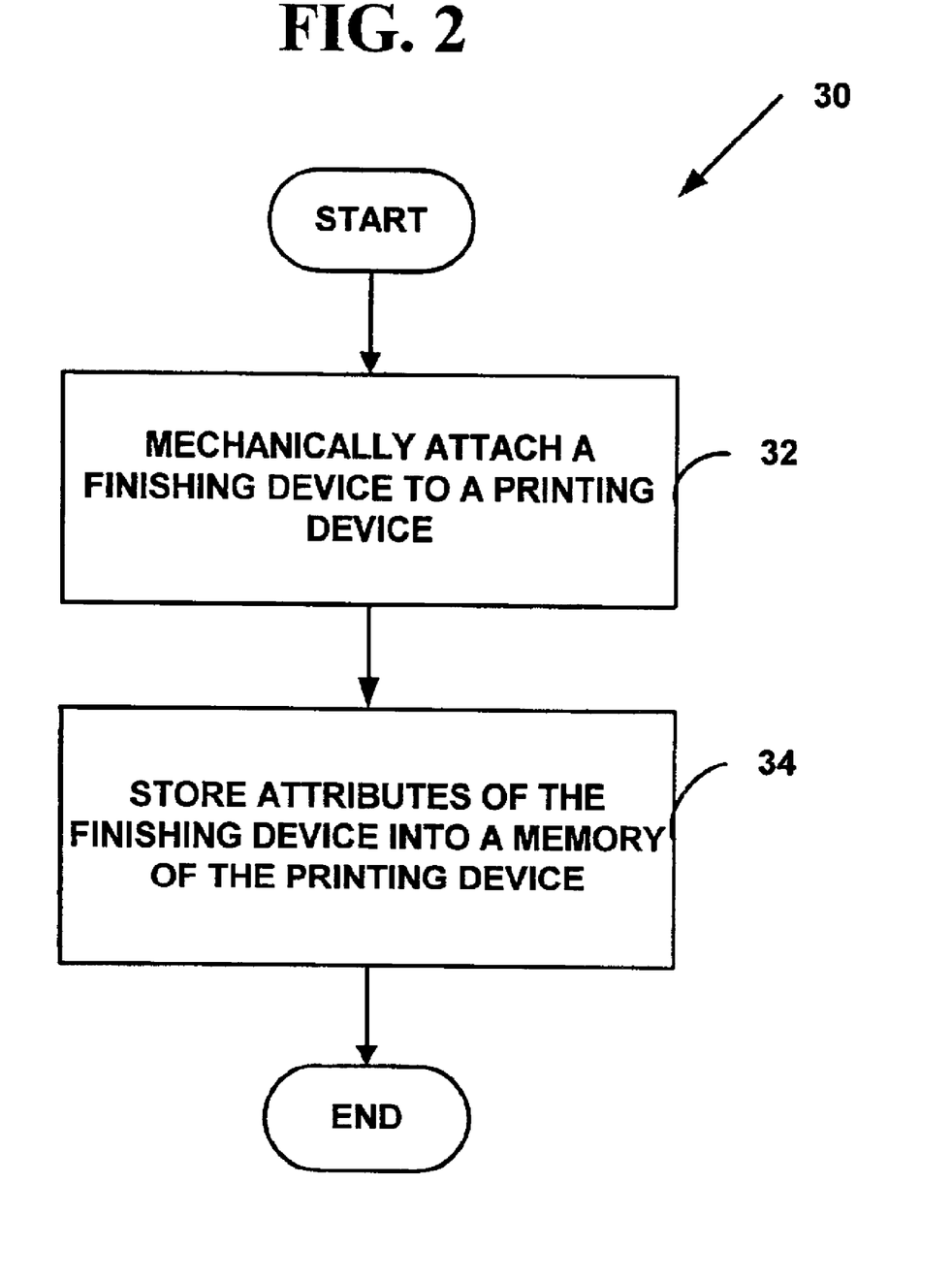
FIG. 2 is a flow diagram illustrating a preferred method for connecting a finishing device to a printing device for digital printing in the digital printing system of FIG. 1.

FIG. 2 is a flow diagram illustrating a preferred method 30 for connecting a finishing device 22, 24 to a printing device 20 for digital printing. The finishing device 22, 24 performs one or more finishing operations on a print job from the printing device 20. The method 30 includes mechanically attaching the finishing device 22, 24 to the printing device 20 such that the finishing device 22, 24 is capable of receiving the print job from the printing device 20, at step 32. At step 34, the printing device 20 stores attributes of the finishing device 22, 24 into a memory of the printing device 20. The attributes of the finishing device 22, 24 correspond to the one or more finishing operations.

For example, the printer operator may connect the stapler-stacker 24 to the printing device 20 by mechanically attaching the stapler-stacker 24 to the printing device 20. The printer operator aligns and mates the two devices in such a manner that the stapler-stacker 24 is capable of receiving a print job from the printing device 20. A print job that is directed to the stapler-stacker 24 exits the printing device 20 and is fed into the stapler-stacker 24 for stacking and optional stapling. Additionally, the printer operator may electrically connect the printing device 20 and the stapler-stacker 24 to supply power to the stapler-stacker 24, send electrical signals that activate or deactivate the optional stapling operation, or indicate when errors occur during the finishing of the print job. Not only may communication between the printing device and the finishing device occur through the electrical connection, but communication may also occur through an optical connection, such as a fiber optic cable or infrared beam, or through a wireless connection, such as the Bluetooth wireless connection, familiar to those of ordinary skill in the art.

After attaching the devices, the printing device 20 stores attributes of the finishing device 22, 24 in its memory at step 34. Attributes that the printing device 20 may store include compulsory attributes, optional attributes, media attributes, and plex attributes of the finishing device 22, 24. For example, the printing device 20 may store the attributes of the stapler-stacker 24 that are compulsory, such as having always to stack the print job, and/or that are optional, such as the option of stapling the print job. Also, the printing device 20 may store the attributes of the stapler-stacker 24 that correspond to what media that the stapler-stacker 24 can process. For example, the stapler-stacker 24 may have a media attribute that it is capable of accepting legal, A4, and ledger media, but that it is incapable of accepting and processing A3 media. Also, the stapler-stacker 24 may have a media attribute that it is capable of stapling at most thirty pages of media. Further, a booklet maker (not shown) may have a plex attribute that it can accept simplex (single-sided) output from the printing device to make a booklet, but that it cannot make duplex (double-sided) output into a booklet. In general, the printing device 20 may store the compulsory, optional, plex, and media attributes of each finishing device 22, 24 that is connected to the printing device 20. In this manner, the printing device 20 can examine its memory and decide whether the finishing device 22, 24 has the attributes that would enable the finishing device 22, 24 to process the print job. It should be understood, however, that the attributes of the finishing device 22, 24 that may be stored are not limited to compulsory, optional, media, or plex, and that other attributes may be stored in the memory of the printing device 20.

The attributes of the finishing device 22, 24 may be entered into the memory of the printing device 20 in a variety of ways. In one preferred embodiment, the attributes are entered from a computer readable medium. For example, the attributes of the finishing device 22, 24 may be encoded on a floppy disc or a CD-ROM as a binary or ASCII file. The printer operator inserts the floppy disc or the CD-ROM into a disc drive associated with the printing device 20, and the printing device 20 reads the attributes from this computer readable medium into its own memory. The disc drive associated with the printing device 20 may be the disc drive 16 that reads the electronic version of the document. In another preferred embodiment, the computer readable medium may comprise a bar code that is associated with the finishing device 22, 24. In this case, the printer operator scans the bar code, and the printing device 20 reads the attributes from this computer readable medium into its own memory. In yet another preferred embodiment, the printer operator enters the attributes through a user interface associated with the printing device 20. For example, the printing device 20 may have an integrated user interface such as a keyboard or touch sensitive graphical display, or the user interface comprises the computer monitor 14 in combination with the computer 12. Once the finishing device 22, 24 is mated to the printing device 20, a utility program running on the printing device 20 or the computer 12 prompts the printer operator to enter the attributes through the user interface.

In a further preferred embodiment, the printing device 20 learns of the attributes of the finishing device 22, 24 from the electronic version of the print job. The electronic version of the document is in a PDL format such as a PDF file or a PostScript file. For example, a PostScript file comprises a header and one or more sections, each of which corresponds to a page of the document. The PostScript file contains the sections in sequence, starting with the section corresponding to the first page of the document and ending with the section corresponding to the last page. A preferred PDL format, however, is the PDF format. Typically, the computer 12 processes the PostScript file sequentially in order to find a particular page. Thus the computer 12 must process all previous pages of the PostScript file before reaching a sought page of the group. The PDF format, in contrast, provides more efficient processing because it allows the computer 12 jump to the specific location in the PDF file where a sought page begins.

The attributes of the finishing device 22, 24 may reside in the header or the sections of the PDL data stream that correspond to the pages of the print job. The PDL file may identify the attributes by a "metatag" familiar to those of ordinary skill in the art. The printing device 20 receives a data stream for the print job in the PDL format and extracts the attributes of the finishing device 22, 24 from the data stream. For example, while processing the data stream, the printing device 20 recognizes the metatag and accordingly stores the attributes associated with the metatag in the printing device 20 memory.

It should be understood, however, that the method of entering the attributes of the finishing device 22, 24 is not restricted to the above preferred embodiments. For example, the finishing device 22, 24 may be electrically, optically, or wirelessly connected to the printing device 20 in such a manner that the devices communicate. In this embodiment, the finishing device 22, 24 communicates its attributes to the printing device 20 through the electrical, optical, or wireless connection. Alternatively, the printing device 20 may retain a list of possible finishing devices 22, 24 and their attributes. The list is installed in the printing device 20 as part of the computer program that operates the printing device 20. If the attached finishing device 22, 24 is in the list, the printing device 20 retrieves the attributes of the finishing device 22, 24 from the list and stores the attributes in memory to determine whether the finishing device 22, 24 is capable of processing the print job.

Selecting a Finishing Device

Figure 3:
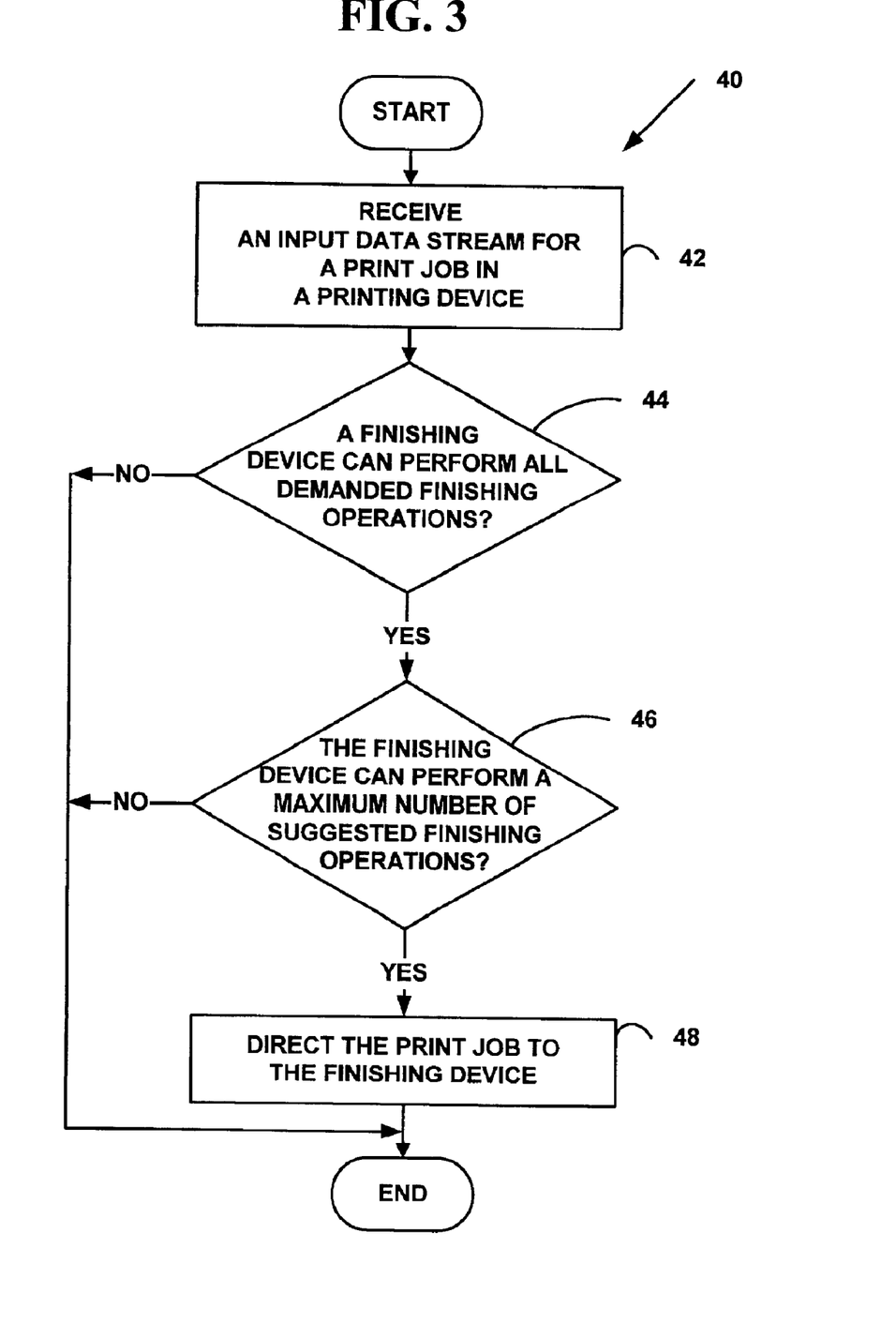
FIG. 3 is a flow diagram illustrating a preferred method for selecting a finishing device for digital printing in the digital printing system of FIG. 1.

Having connected the finishing devices 22, 24 to the printing device 20 and stored the attributes of the finishing devices 22, 24 in the printing device's 20 memory, the printer operator may submit print jobs for printing and finishing. The print job is processed by one finishing device 22, 24 after printing on the printing device 20. FIG. 3 is a flow diagram illustrating a preferred method 40 for selecting a finishing device 22, 24 for digital printing. The finishing device 22, 24 performs one or more finishing operations on a print job from a printing device 20. The method 40 includes receiving an input data stream for the print job in the printing device 20 at step 42. The input data stream is an electronic version of the print job. At step 44, the printing device 20 determines whether the finishing device 22, 24 can perform all demanded finishing operations. The input data stream includes instructions associated with the demanded finishing operations. When the finishing device 22, 24 can perform all demanded finishing operations, the printing device 20 determines whether the finishing device 22, 24 can perform a maximum number of suggested finishing operations at step 46. The printing device 20 includes the suggested finishing operations in a memory. At step 48, when the finishing device 22, 24 can perform the maximum number of the suggested finishing operations, the printing device 20 directs the print job to the finishing device 22, 24. In this manner, the printing device 20 selects the most appropriate finishing device 22, 24 for the print job according to predetermined criteria.

As described above, the computer 12 sends the print job to the printing device 20 as a data stream containing some or all of a PDL file. The printing device 20 receives the data stream and searches the data stream for instructions for which finishing operations are demanded for the print job. The instructions may be in the form of one or more metatags in the header or body of the PDL file. For example, for PDL files in the PDF format, the metatags may be of the form of Expression 1:

$$<finish>staple<\backslash finish> \tag{1}$$

indicating that when the printer operator requests printing and finishing of this print job, the printing device 20 will send its output to a finishing device 22, 24 that can staple the print job, if such a finishing device 22, 24 is available. Alternatively, for PDL files in general, the metatags may be of the form of one or more Kodak descriptors ("KDKs") familiar to those of ordinary skill in the digital printing art. The KDKs reside in the header or body of the PDL file. KDKs were developed by the Eastman Kodak Company of Rochester, N.Y. to control printing devices 20 from within files encoding the content of print runs. In a preferred embodiment, the instructions contain a list of demanded finishing operations that the selected finishing device 22, 24 must be capable of performing. It should be understood, however, that the demanded finishing operations need not be included in PDF metatag or KDK metatag format, and that other methods for conveying the instructions to the printing device 20 are possible.

Upon receiving the instructions in the PDL file, the printing device 20 determines which finishing devices 22, 24 can simultaneously perform all of the demanded finishing operations. For each finishing device 22, 24 whose attributes are stored in the memory of the printing device 20, the printing device 20 compares the demanded finishing operations with the attributes. The printing device 20 may compare the demanded finishing operations with the compulsory attributes, optional attributes, media attributes, and/or plex attributes of the finishing device 22, 24. If the attributes of the finishing device 22, 24 include all the demanded finishing operations, the printing device 20 may select the finishing device 22, 24 to receive the print run. If the attributes of the finishing device 22, 24 lack any of the demanded finishing operations, however, the printing device 20 will not select the finishing device 22, 24 and not direct the print run to the finishing device 22, 24. If no finishing devices 22, 24 connected to the printing device 20 have attributes corresponding to demanded finishing operations, the print run typically terminates or is sent to a top exit of the printing device 20.

The printing device 20 also determines which finishing device or devices 22, 24 can perform the maximum number of suggested printing options. The suggested finishing operations are retained in the memory of the printing device 20. Suggested finishing operations are finishing operations that the printer operator would prefer performed on the print job. If the finishing device 22, 24 cannot perform the suggested finishing operation, the printing device 20 could still send the print job to the finishing device 22, 24. In one preferred embodiment, the suggested finishing operations are default settings for finishing that represent preferences of the printer operator or vendor of the printing device 20 for finishing operations when the print job does not explicitly demand a finishing operation. For example, the default finishing operation may prescribe stacking and legal media. If no finishing devices 22, 24 that are connected to the printing device 20 are capable of stacking, the printing device 20 may ignore the default and send the print job to whatever finishing device 22, 24 can satisfy all demanded finishing operations and a maximum of the other suggested finishing operations.

In another preferred embodiment, the printer operator stores the suggested finishing operations in the memory of the printing device 20. For example, the printer operator enters the suggested finishing operations through a user interface associated with the printing device 20. Also, the printing device 20 may have an integrated user interface such as a keyboard or touch sensitive graphical display, or the user interface comprises the computer monitor 14 in combination with the computer 12. Before running the print job, a utility program running on the printing device 20 or the computer 12 prompts the printer operator to enter the suggested finishing operations through the user interface. Not only may the printer operator enter the suggested finishing operations for the first time, but the printer operator may also change defaults in the memory and change suggested finishing operations that were entered previously.

In operation, the printing device 20 retains in its memory which finishing devices 22, 24 are available to the printing device 20 for receiving the output of the printing device 20. When selecting the finishing device 22, 24 to receive the output, the printing device 20 preferably repeats the above determining steps 44, 46 for each available finishing device 22, 24 until the printing device 20 determines which of the available finishing devices can perform both all demanded finishing operations and the maximum number of suggested finishing operations. If one finishing device 22, 24 can perform both all demanded finishing operations and the maximum number of suggested finishing operations, the printing device 20 selects this finishing device 22, 24 to perform the demanded and suggested finishing operations on the print run. If, however, more than one available finishing device 22, 24 can perform both all the demanded finishing operations and the maximum number of suggested finishing operations, the printing device 20 may arbitrate which finishing device 22, 24 is selected. Alternatively, the printing device 20 may prompt the printer operator to select explicitly between the more than one finishing devices 22, 24.

Examples of Selecting Finishing Devices

In a first example, the printing device 20 is connected to a stapler 22. The stapler 22 can staple letter, legal, or A4 media that it receives from the printing device 20. Additionally, the printing device 20 has a top exit to which all media types may be directed. The printing device 20 may direct the print job to the top exit without performing any finishing operations. In connecting the stapler 22 to the printing device 20, the printer operator stores the attributes of the stapler 22 and the top exit in the printing device's 20 memory. The stapler 22 has a compulsory attribute that it must staple, and has media attributes that it can staple letter, legal, or A4 media. The top exit has no attributes. In this example, however, the printer operator does not store any defaults or suggested finishing operations in the printing device 20.

The printer operator sends a print job to the printing device 20. In this example, the print job demands that it is to be stapled and is to be printed on letter media. The printing device 20 receives the print job as a PDL file in a data stream. The PDL file includes KDKs or other metatags as instructions to the printing device 20 that the print job must be stapled and printed on letter media. The printing device 20 compares the demanded finishing operation, stapling on letter media, to the attributes of the stapler 20. As the stapler 20 can perform stapling on letter media, and there are no suggested finishing operations residing in the printing device's 20 memory, the printing device 20 selects the stapler 20 to finish the print job. The printing device 20 also compares the demanded finishing operations to the attributes of the top exit. As the top exit cannot staple, however, the printing device 20 does not select the top exit. Therefore, in this example, the printing device 20 selects the stapler 22 as the finishing device 22, 24 for the print job. After printing the print job on letter media, the printing device 20 directs the print job to the stapler 22.

In a second example, the printing device 20 is connected to a stapler 22 and a stapler-stacker 24. The stapler 22 can staple letter, legal, or A4 media that it receives from the printing device 20. The stapler-stacker 24 can staple and stack all media types. Additionally, the printing device 20 has a top exit to which all media types may be directed. The printing device 20 may direct the print job to the top exit without performing any finishing operations. In connecting the stapler 22 to the printing device 20, the printer operator stores the attributes of the stapler 22, the stapler-stacker 24, and the top exit in the printing device's 20 memory. The stapler 22 has a compulsory attribute that it must staple, and has media attributes that it can staple letter, legal, or A4 media. The stapler-stacker 24 has a compulsory attribute that it must stack, has an optional attribute that it may staple, and has media attributes that it can stack and staple all media. The top exit has no attributes. In this example, the printing device 20 also suggests that all print jobs are stacked. Either the printer operator stores stacking as a suggested finishing operation in the printing device 20, or the printing device 20 has stacking stored as a default in its memory.

The printer operator sends a print job to the printing device 20. In this example, the print job demands that it is to be stapled and is to be printed on letter media. The printing device 20 receives the print job as a PDL file in a data stream. The PDL file includes KDKs or other metatags as instructions to the printing device 20 that the print job must be stapled and printed on letter media. The printing device 20 compares the demanded finishing operation, stapling on letter media, to the attributes of the stapler 22. The stapler 22 can perform the demanded finishing operation of stapling on letter media, but the stapler 22 cannot perform the suggested finishing operation of stacking. Therefore the stapler 22 can perform all demanded finishing operations but no suggested finishing operations. The printing device 20 also compares the demanded finishing operation, stapling on letter media, to the attributes of the stapler-stacker 24. Stapling is an optional attribute of the stapler-stacker 24. The stapler-stacker 24 can perform the demanded finishing operation of stapling on letter media, and the stapler-stacker 24 can perform the suggested finishing operation of stacking. Stacking is a compulsory attribute of the stapler-stacker 24. Therefore the stapler-stacker 24 can perform all demanded finishing operations and one suggested finishing operation. The printing device 20 also compares the demanded finishing operations to the attributes of the top exit. As the top exit cannot staple, however, the printing device 20 does not select the top exit. Therefore, in this example, the printing device 20 selects the stapler-stacker 24 as the finishing device 22, 24 for the print job because it can perform all demanded finishing operations and the maximum number, one, suggested finishing operation. After printing the print job on letter media, the printing device 20 directs the print job to the stapler-stacker 24.

In a third example, the printing device 20 is connected to a stapler 22 and a stapler-stacker 24. The stapler 22 can staple letter, legal, or A4 media that it receives from the printing device 20. The stapler-stacker 24 can staple and stack all media types. Additionally, the printing device 20 has a top exit to which all media types may be directed. The printing device 20 may direct the print job to the top exit without performing any finishing operations. In connecting the stapler 22 and the stapler-stacker 24 to the printing device 20, the printer operator stores the attributes of the stapler 22 and the stapler-stacker 24 in the printing device's 20 memory. The stapler 22 has a compulsory attribute that it must staple, and has media attributes that it can staple letter, legal, or A4 media. The stapler-stacker 24 has a compulsory attribute that it must stack, has an optional attribute that it may staple, and has media attributes that it can stack and staple all media. The top exit has no attributes. In this example, the printing device 20 also suggests that all print jobs are stacked and folded. Either the printer operator stores stacking and folding as a suggested finishing operations in the printing device 20, or the printing device 20 has stacking and folding stored as a default in its memory.

The printer operator sends a print job to the printing device 20. In this example, the print job demands that it is to be stapled and is to be printed on letter media. The printing device 20 receives the print job as a PDL file in a data stream. The PDL file includes KDKs or other metatags as instructions to the printing device 20 that the print job must be stapled and printed on letter media. The printing device 20 compares the demanded finishing operation, stapling on letter media, to the attributes of the stapler 22. The stapler 22 can perform the demanded finishing operation of stapling on letter media, but the stapler 22 cannot perform the suggested finishing operations of stacking and folding. Therefore the stapler 22 can perform all demanded finishing operations but no suggested finishing operations. The printing device 20 also compares the demanded finishing operation, stapling on letter media, to the attributes of the stapler-stacker 24. Stapling is an optional attribute of the stapler-stacker 24. The stapler-stacker 24 can perform the demanded finishing operation of stapling on letter media, and the stapler-stacker 24 can perform the suggested finishing operation of stacking. Stacking is a compulsory attribute of the stapler-stacker 24. The stapler-stacker 24, however, cannot perform the suggested finishing operation of folding. Therefore the stapler-stacker 24 can perform all demanded finishing operations and one suggested finishing operation. The printing device 20 also compares the demanded finishing operations to the attributes of the top exit. As the top exit cannot staple, however, the printing device 20 does not select the top exit. Therefore, in this example, the printing device 20 selects the stapler-stacker 24 as the finishing device 22, 24 for the print job because it can perform all demanded finishing operations and the maximum number, one, suggested finishing operation. The printing device 20 selects the stapler-stacker 24 as the finishing device 22, 24 for the print job even though it cannot perform the suggested finishing operation of folding. After printing the print job on letter media, the printing device 20 directs the print job to the stapler-stacker 24.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or component may be used in the block diagrams.

I claim:

1. A method for selecting a finishing device for digital printing, wherein the finishing device performs one or more finishing operations on a print job from a printing device, the method comprising the steps of:

receiving a data stream for the print job in the printing device, wherein the data stream is an electronic version of the print job;

determining whether the finishing device can perform all demanded finishing operations, wherein the data stream includes instructions associated with the demanded finishing operations;

when the finishing device can perform all demanded finishing operations, determining whether the finishing device can perform a maximum number of suggested finishing operations, wherein the printing device includes the suggested finishing operations in a memory; and when the finishing device can perform the maximum number of the suggested finishing operations, directing the print job to the finishing device.

2. A computer readable medium, having stored therein instructions for causing a central processing unit to execute the method of claim 1.

3. The method of claim 1 further comprising the step of:

repeating the determining steps for each available finishing device of one or more available finishing devices until the finishing device is selected.

4. The method of claim 1 further comprising the step of:

when the finishing device cannot perform all the demanded finishing operations, not directing the print job to the finishing device.

5. The method of claim 1 further comprising the step of:

when the finishing device cannot perform the maximum number of the suggested finishing operations, not directing the print job to the finishing device.

6. The method of claim 1 wherein the electronic version of the document is formatted in a Page Description Language.

7. The method of claim 6 wherein the Page Description Language is a Portable Document Format.

8. The method of claim 6 wherein the instructions associated with the demanded finishing operations comprise one or more metatags.

9. The method of claim 1 further comprising the step of:

storing the suggested finishing operations into the memory of the printing device.

10. The method of claim 1 wherein the suggested finishing operations are defaults of the printing device.

11. A method for selecting a finishing device for digital printing, wherein the finishing device performs one or more finishing operations on a print job from a printing device, the method comprising the steps of:

receiving a data stream for the print job in the printing device, wherein the data stream of the print job is formatted in a Page Description Language;

determining whether the finishing device can perform all demanded finishing operations, wherein the data stream includes one or more metatags associated with the demanded finishing operations;

when the finishing device cannot perform all the demanded finishing operations, not directing the print job to the finishing device;

when the finishing device can perform all demanded finishing operations, determining whether the finishing device can perform a maximum number of suggested finishing operations, wherein the printing device includes the suggested finishing operations in a memory;

when the finishing device cannot perform the maximum number of the suggested finishing operations, not directing the print job to the finishing device; and when the finishing device can perform the maximum number of the suggested finishing operations, directing the print job to the finishing device.

12. A computer readable medium, having stored therein instructions for causing a central processing unit to execute the method of claim 11.

13. The method of claim 12 wherein the Page Description Language is a Portable Document Format.

* * * * *